United States Patent
Chowdhury et al.

(10) Patent No.: US 8,671,168 B2
(45) Date of Patent: *Mar. 11, 2014

(54) IDENTIFICATION OF THE LOCATION OF NODES DISTRIBUTED IN AD HOC NETWORKS

(75) Inventors: Atish Datta Chowdhury, Bangalore (IN); Koushik Sinha, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/162,704

(22) Filed: Jun. 17, 2011

(65) Prior Publication Data

US 2012/0324062 A1 Dec. 20, 2012
US 2013/0254355 A9 Sep. 26, 2013

Related U.S. Application Data

(63) Continuation of application No. 11/357,839, filed on Feb. 17, 2006, now Pat. No. 8,040,859.

(51) Int. Cl.
*G06F 15/177* (2006.01)

(52) U.S. Cl.
USPC .......... 709/220; 370/338; 370/328; 370/389; 370/324

(58) Field of Classification Search
USPC ................ 709/220; 370/338, 389, 328, 324
See application file for complete search history.

(56) References Cited

U.S. PATENT DOCUMENTS

2007/0195759 A1 * 8/2007 Chowdhury et al. ......... 370/389

* cited by examiner

*Primary Examiner* — Kyung H Shin
(74) *Attorney, Agent, or Firm* — Schiff Hardin LLP

(57) ABSTRACT

A location of node i in a network having a plurality of nodes is identified by intersecting regions that are guaranteed to contain the node i with respect the other nodes that are neighbors of the node i and iteratively minimizing the size of the intersection region containing the node i.

8 Claims, 9 Drawing Sheets

IDENTIFICATION OF THE LOCATION OF NODES DISTRIBUTED IN AD HOC NETWORKS

CROSS REFERENCE TO RELATED APPLICATIONS

This application is a continuation of U.S. patent application Ser. No. 11/357,839, filed Feb. 17, 2006, now U.S. Pat. No. 8,040,859 issued on Oct. 18, 2011.

TECHNICAL FIELD OF THE INVENTION

The present invention relates to locating nodes in networks such as ad hoc networks.

BACKGROUND OF THE INVENTION

Typically, the nodes of an ad hoc network are randomly and arbitrarily deployed in such a manner that their locations are not necessarily known a priori. For example, wireless sensors are often deployed in ad hoc networks and are used for sensing, detection, and tracking. Such networks are being applied in military, ecological, environmental, and domestic systems for monitoring and/or control. Wireless sensor networks are also being used to automate buildings, universities, factories, etc. Because of the ad hoc nature of these networks, few assumptions can be made about their topologies.

Further, in some cases, the nodes of a network can change locations with varying or constant frequency. A network comprised of such mobile nodes is typically referred to as a mobile network.

Most location estimation systems locate the nodes in mobile and ad hoc networks by trilaterating and/or triangulating signals received by the nodes in order to obtain an estimate of the node's position.

A LOS (line-of-sight) path or direct path is the straight line connecting the transmitter and the receiver. NLOS (non-line-of-sight) signals occur due to multi-path conditions in which the received signals have followed reflected, diffracted, and/or scattered paths. Such signals introduce excess path lengths in the actual Euclidian distance between the transmitting nodes and the receiving nodes. Thus, an NLOS error is introduced in the trilateration and/or triangulation and is defined to be the excess distance traversed compared to the distance traversed along the direct path. This excess distances is always positive. The corruption of LOS signals by NLOS signals and also by Gaussian measurement noise are the major sources of error in all location estimation systems.

The Global Positioning System (GPS) is perhaps the most widely publicized location-sensing system. Unfortunately, GPS does not scale well in dense urban areas or in indoor locations.

Also, modeling of the radio propagation environment helps in providing a more accurate location estimate by mitigating the effect of NLOS errors. While reasonably accurate radio propagation models exist for outdoor conditions, there are unfortunately no such unanimously accepted models for indoor environments. Attempts have been made to mitigate the effects of NLOS errors. However, in the absence of a suitable model for predicting the location of a mobile terminal, it is possible that the node may be far away from its estimated location.

Therefore, rather than implementing location prediction as described above, the problem of discovering the location of a node might instead be considered in terms of finding the geographical region in which a node is guaranteed to be found and of then reducing or minimizing the size of this region.

It can be assumed that a small percentage of the terminals (nodes) in the network know their locations with a high degree of accuracy—such as by using GPS or by some other means. Such nodes may be termed reference nodes. A distributed algorithm can implement computational geometric techniques in order to compute the smallest region within which a node is guaranteed to be found, based on all non-reference nodes in the network.

In addition, the location of the regions containing the nodes in the network can be improved through the exchange of location information between the neighbor nodes in O(nD) time, where n and D are the number of nodes and diameter of the network, respectively.

The present invention, therefore, is directed to a system and/or method for finding the geographical region in which a node is guaranteed to be found. The present invention, for example, can implement one or more of the features discussed above, such as minimizing the size the a region in which a node is located.

SUMMARY OF THE INVENTION

According to one aspect of the present invention, a method of identifying a location of a node i in a network having a plurality of nodes comprises the following: receiving a location of a region that is guaranteed to contain the node i, wherein the determining of a location of a region is based on range information obtained with respect to other nodes in a neighborhood of the node i; determining a region of residence of the node i based on the region that is guaranteed to contain the node i, wherein the region residence has a size; and, iteratively minimizing the size of the region of residence of the node i.

According to another aspect of the present invention, a computer readable storage medium has program code stored thereon which, when executed, identifies a location of node i in a wireless network having a plurality of nodes by performing the following functions: a) receiving a location of a first region from a node j, wherein the first region is guaranteed to contain the node i, wherein the first region has a size, wherein the size of the first region is dependent upon a range between the nodes i and j, and wherein the node j is within a transmission range of the node i; b) receiving a location of a second region from a node k, wherein the second region is guaranteed to contain the node i, wherein the second region has a size, wherein the size of the second region is dependent upon a range between the nodes i and k, and wherein the node k is within a transmission range of the node i; c) receiving a location of a third region from a node l, wherein the third region is guaranteed to contain the node i, wherein the third region has a size, wherein the size of the third region is dependent upon a range between the nodes i and l, and wherein the node l is within a transmission range the node i; d) determining a minimum region of residence of the node i from an intersection of the first, second, and third regions; and, e) iteratively reducing the size of the minimum region of residence of the node i.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
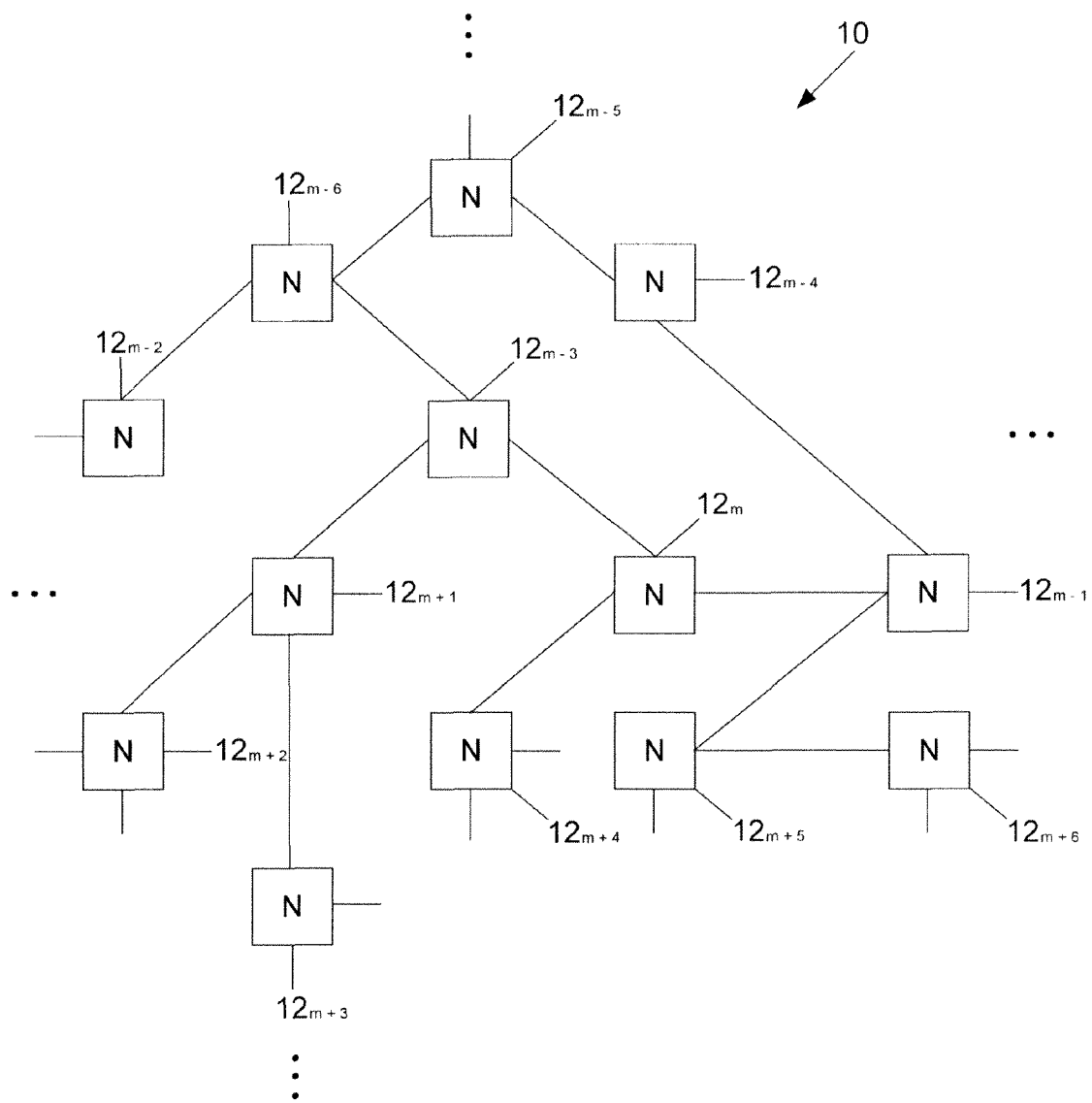
FIG. 1 illustrates a network comprising a plurality of nodes which are configured in accordance with an embodiment of the present invention.

FIG. 1 shows a network 10 comprising nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$. The network 10, for example, may be a sensor network such as a wireless sensor network, and the nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$, for example, may be sensor nodes such as wireless sensor nodes. However, the network 10 can be any other type of network, and the nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$ can be nodes other than wireless sensor nodes.

In the case where the network 10 is a wireless network, the links between the nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$ are wireless links such as infrared links, ultrasonic links, RF links, optical links, or any other type of wireless link. Alternatively, in a case where the network 10 is not a wireless network, these links may be provided by electrical wires, optical fiber cables, or other physical connections between the nodes.

As shown in FIG. 1, each of the nodes may be in direct communication with one or more other nodes and may be in indirect communication with one or more of the remaining nodes. For example, because of range limitations or otherwise, the node $12_{m-3}$ is in direct communication with the nodes $12_{m-6}, 12_m,$ and $12_{m+1}$, and is in indirect communication with other nodes such as the nodes $12_{m-2}$ and $12_{m-5}$ through node $12_{m-6}$. The nodes $12_{m-6}, 12_m,$ and $12_{m+1}$ may be considered to be within the view of the node $12_{m-3}$ because they are in direct communication with the node $12_{m-3}$. However, other nodes such as the nodes $12_{m-4}, 12_{m-1},$ and $12_{m+4}$ are considered to be in indirect communication with the node $12_{m-3}$ because they can communicate with the node $12_{m-3}$ only through other nodes.

Figure 2:
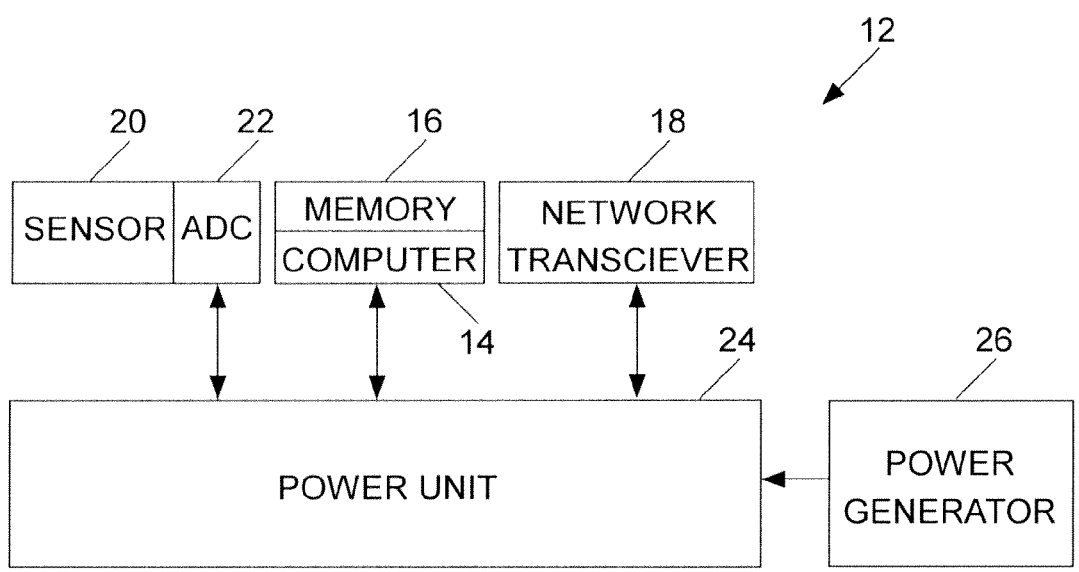
FIG. 2 illustrates a representative one of the nodes of the sensor network shown in FIG. 1; and, FIG. 3 shows a triangular region of residence ABC for a node v of an ad hoc network.

As shown in FIG. 2, the node 12, which, for example, may be individually representative of the nodes shown in FIG. 1, includes a computer 14, a memory 16, and a network transceiver 18. Alternatively, the computer 14 may be a processor or a computer/data processor combination. Accordingly, the word computer is used generically herein.

The network transceiver 18 permits communication between the node 12 and the other nodes in the network 10. For example, in the case where the network 10 is a wireless network, the transceiver 18 supports communication with the nodes of the node 12 in which it views, and the communications transmitted or received by the network transceiver 18 can be wireless communications over wireless links as discussed above. Alternatively, in the case where the network 10 is not a wireless network, the communications transmitted or received by the network transceiver 18 can be communications over physical or other links.

In the case where the node 12 is a sensor node, the node 12 also includes a sensor 20. If the sensor 20 is an analog sensor, an A/D converter 22 is provided to convert the analog signal from the sensor 20 to a digital signal for processing by the computer 14. The sensor 20 can be any sort of sensor suitable for the particular application of the network 10. A power unit 24 is supplied with power from a power generator 26, and provides power to and supports communication between the computer 14, the memory 16, the network transceiver 18, and the A/D converter 22. The power generator 26 can be a battery, a power supply, or any other type device capable of providing appropriate power for the node 12.

If the network 10 is a wireless sensor network, the node 12 has a communication radius in addition to a sensing radius. The communication radius defines a distance over which the node 12 is capable of effectively communicating with the neighbor nodes in its view. The sensing radius defines a distance over which the sensor 20 of the node 12 is capable of effectively sensing a condition. The communication radius of the node 12 should be at least as great as the sensing radius of the sensor 20 of the node 12. Each of the other nodes of the network may be similarly constructed. Moreover, each node 12 of the network 10 should have at least one other node 12 within its communication radius. These relationships ensure that each of the nodes 12 of the network 10 is able to communicate any condition that it senses to at least one neighbor node in the network 10. If desired, the communication radius of the node 12 can be twice the sensing radius of the sensor 20 of the node 12.

An ad hoc network such as the network 10 may be modeled as a graph $G=(V,E)$ consisting of n nodes, where V is the set of all nodes $|V|=n$, and E is the set of edges in the graph G. The nodes may be either stationary or mobile. All communication links are assumed to be bi-directional, although this assumption is not required. Node v can be considered to be a neighbor of node u if nodes v and u are within each other's transmission range. The neighborhood of a node i is designated $N(i)$ and includes all nodes within its transmission range.

A small percentage of the nodes in the graph G are assumed to know their individual locations with a high degree of precision, either through the use of GPS or some other means. These nodes are designated as RNs and serve as reference nodes in the network. Initially, all nodes other than the reference nodes do not possess any knowledge of their location. The reference nodes are assumed to possess point locations (zero area regions) while the non-reference nodes are initially assumed to reside in a region of infinite size. However, in practice, the reference nodes can have any arbitrarily shaped location regions. The set of reference nodes is denoted as $\text{Ref}_u:=\{u:u\in V, u \text{ is a reference node}\}$.

The measured range between two nodes u and v is given by the following equation:

$$r_{uv} = d_{uv} + \eta_{uv} + c\tau_{uv} \qquad (1)$$

where $d_{uv}$ represents the unknown Euclidian distance between u and v, $\eta_{uv}$ completely models the combined additive effects of thermal receiver noise, signal bandwidth, and the signal-to-noise ratio, c is the speed of light through air, and $c\tau_{uv}$ represents the NLOS distance error and is usually the dominant error contributor to the measured range. The quantity $\eta_{uv}$ has been shown to be a zero-mean normal random variable and, hence, can be either measured or pre-computed. It is assumed that $\eta_{uv}$ is always additive.

The set RR is defined as the set of all such measured ranges for all node-pairs in the network, i.e., RR={$r_{ij}$:$r_{ij}$∈E, ∀i, j∈V}. Also, the set $RR_i$ is defined as the set of all measured ranges for all node-pairs containing the node i, i.e., $RR_1$={$r_{ij}$, j∈N(i)} where, as discussed above, N(i) is the neighborhood of the node i.

According to one embodiment of the present invention, triangulation can be used to compute the region where a node is guaranteed to be found.

Definition 1.

The region of residence $R_i$ of a node i is defined to be the region where i is guaranteed to be found.

The region of residence of a reference node is assumed to be a point location having zero area. All other nodes have a region of residence of non-zero finite area. The objective is to find the region of residence of a node i having a minimum area.

Lemma 1:

The range measurements obtained for a node u from a neighbor node v such that v∈N(u) is always be greater than or equal to the Euclidian distance between nodes u and v.

Proof:

The proof of Lemma 1 follows directly from equation (1).

Given two nodes u and v and a range measurement $r_{uv}$ from node v to node u, the region of residence of node u in the view of node v is the region formed by extending the region of residence $R_v$ of node v in every direction by the measured range value $r_{uv}$. This operation is denoted by the operator ⊕, whose left operand is a region of residence and whose right operand is a range value. Thus, the region of residence of node u in the view of node v is $R_{uv}$=$R_v$⊕$r_{uv}$. $R_v$ is denoted as the viewed region of residence of node u.

Figure 3:
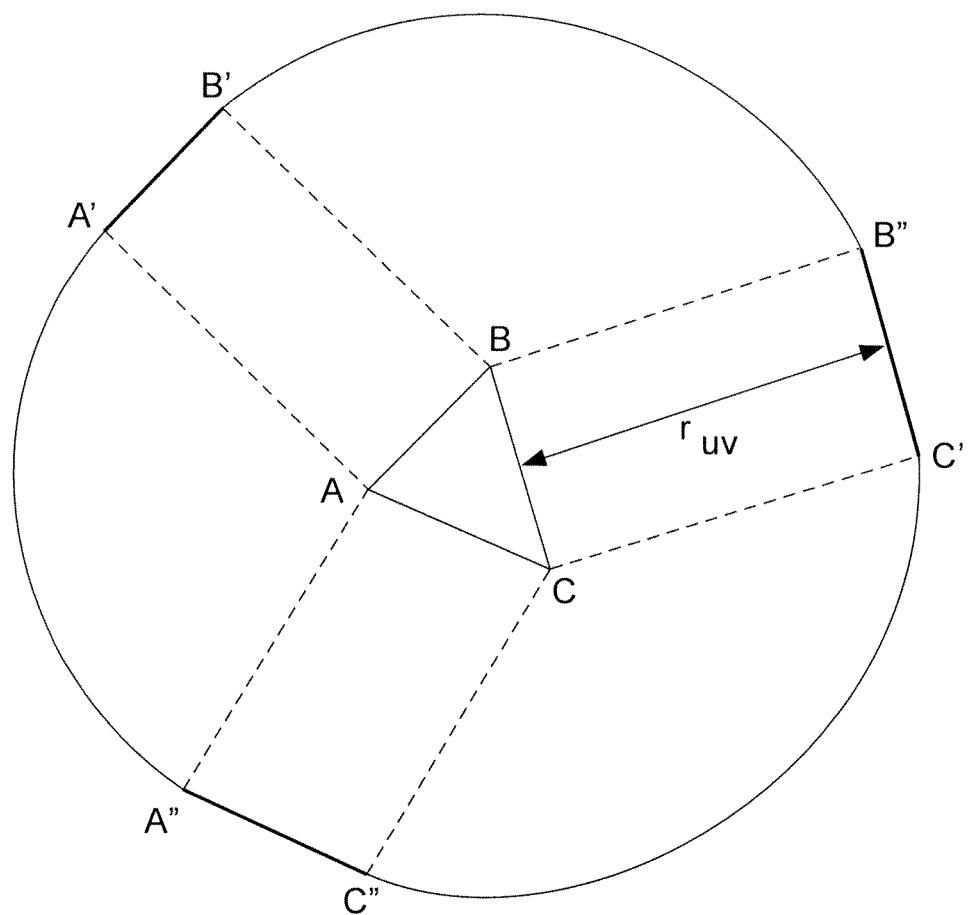

For example, FIG. 3 shows a triangular region of residence ABC for node v. The range of node u measured by node v is $r_{uv}$. A line A'B' may be drawn parallel to AB at a distance $r_{uv}$ from AB and on the opposite side of point C such that AA'B'B forms a rectangle. Similarly, a line B"C' may be drawn parallel to BC on the side opposite to that of point A at a distant $r_{uv}$ from BC so as to form a rectangle BB"C'C, and also a line C"A" may be drawn parallel to CA on the side opposite to that of point B at a distant $r_{vv}$ from CA so that CC" A"A is a rectangle.

Then, with point A as a center, a circular arc of radius $r_{uv}$ can be drawn so as to cut the lines A'B' and C"A" at points A' and A", respectively. Similarly, two other circular arcs of radius $r_{uv}$ can be drawn as follows: i) with point B as a center so as to cut the lines A'B' and B"C' at points B' and B", respectively, and ii) with point C as a center so as to cut the lines C'B" and C"A" at points C' and C", respectively. The closed convex region A' B'B"C' C"A" is i.e., the region of residence of node u in the view of node v.

It may be mentioned here that the region $R_{uv}$ can also be viewed as the Minkowski's sum of the region of residence R of the node v and a circle of radius $r_{uv}$ centered at the origin. It may be assumed that the initial regions of residence of all nodes are bounded either by straight line segments or by circular arcs. Hence, the region $R_{uv}$ will also be bounded by straight line segments and/or circular arcs only.

Accordingly, Lemma 2: Node u is guaranteed to be found at some location inside $R_{uv}$.

Theorem 1:

The current minimum region of residence $R_u$ of a node u, based on the information from its neighbors, is the region formed by the intersection of the viewed regions of residence $R_{ui}$, i∈N(u), i.e., $\mathcal{R}_u$=∩$_{i∈N(u)}R_{ui}$.

Proof:

The proof follows from Lemma 2 because the common intersection region is the smallest region that satisfies Lemma 2 for all neighbors i∈N(u). This current minimum region of residence may subsequently be refined (contracted in size) by improved viewed regions of residences from its neighbors.

Theorem 2:

The minimum region of residence of a node u that is designated $\mathcal{R}_u$ and that is based on the information from its neighbors cannot subsequently be made larger by an altered viewed region of residence $R_{ua}$ from any neighbor i.

Proof:

The proof follows directly from Theorem 1.

To find the minimum region in which a node resides, an algorithm can be arranged to proceed in essentially two steps. Every node in the network determines its current minimum region in which it resides by ranging with each of its neighbor nodes. Then, once each node has determined its current minimum region of residence, it attempts to improve the regions of residence of each neighbor node, using its own region of residence and the range measurements that it obtained from its neighbor nodes.

Figure 4:
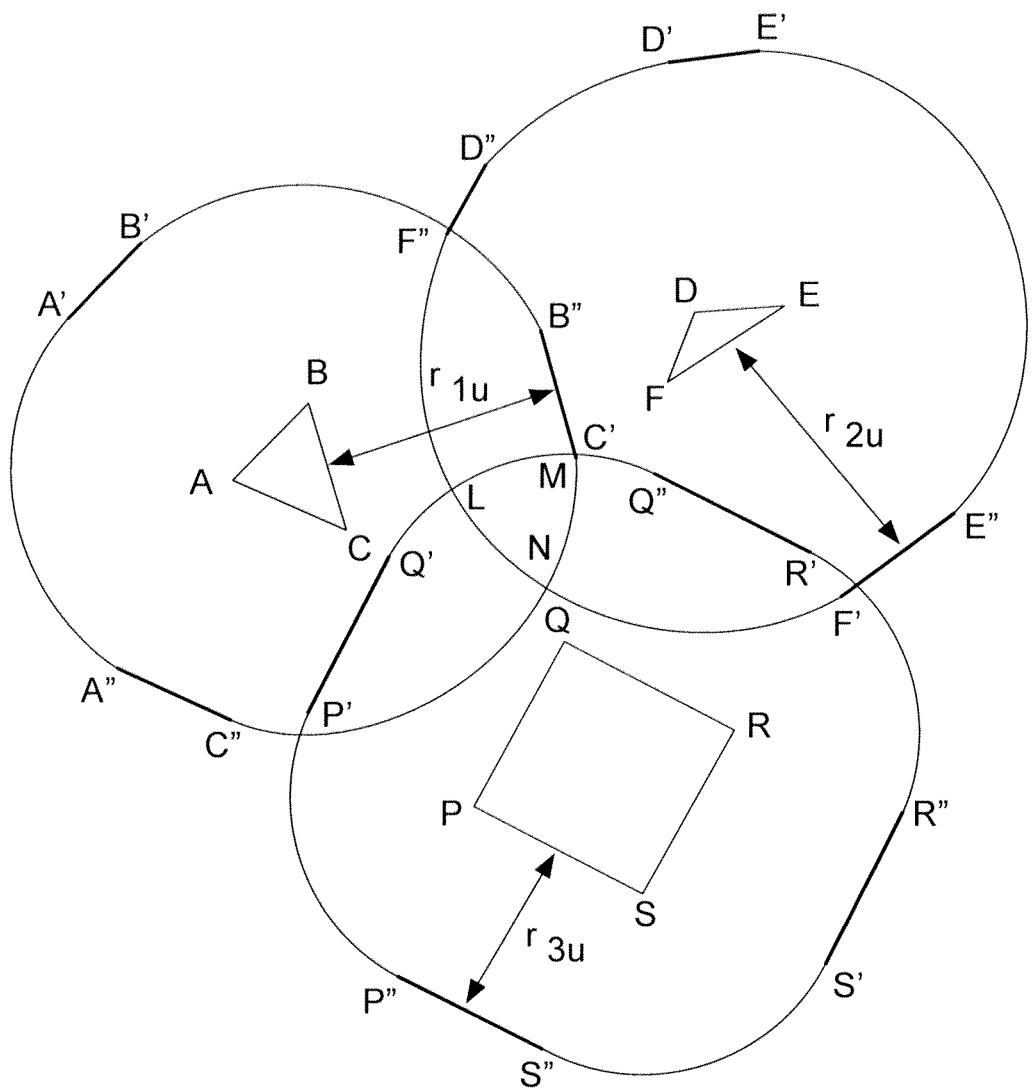
FIG. 4 demonstrates a probable situation where the triangles ΔABC and ΔDEF define the region of residence of nodes i and j, respectively, and PQRS defines the region of residence of node k.

For example, a node u with three neighbor nodes i, and k can be considered. FIG. 4 demonstrates a probable situation where the triangles ΔABC and ΔDEF define the region of residence of nodes i and j, respectively, and PQRS is the region of residence of node k. For simplicity, it may be assumed that the regions of residence are polygons. However, this assumption is not required. The range measurements that node u obtains by ranging with nodes i, j, and k may be denoted as $r_{1u}$, $r_{2u}$, and $r_{3u}$, respectively.

According to the view of node i, node u lies in the region $R_{ui}$ dictated by the shape A'B'B"C'C"A" as demonstrated in connection with FIG. 1. Similarly, D'E'E"F'F"D" and P'Q'Q"R'R"S'S"P" define the regions of residence $R_{uj}$ and $R_{uk}$ of node u in the views of the nodes j and k, respectively. Following Theorem 1, the shaded region LMN is the intersection of the regions of residence $R_{ui}$, $R_{uj}$, and $R_{uk}$, is designated $\mathcal{R}_u$, and defines the minimum region of residence of node u where u is guaranteed to be found.

Once the minimum region of residence of node u is found, node u then tries to refine the minimum region of residence of a neighbor node v, ∀v∈N(u), using $\mathcal{R}_u$ and the corresponding measured range $r_{uv}$ from v. A new minimum region of residence of node v, $\mathcal{R}'_v$, is defined as the intersection of the viewed region of residence $R_{vu}$ of node v as viewed by node u and the current minimum region of residence $\mathcal{R}_v$ of node v.

Figure 5:
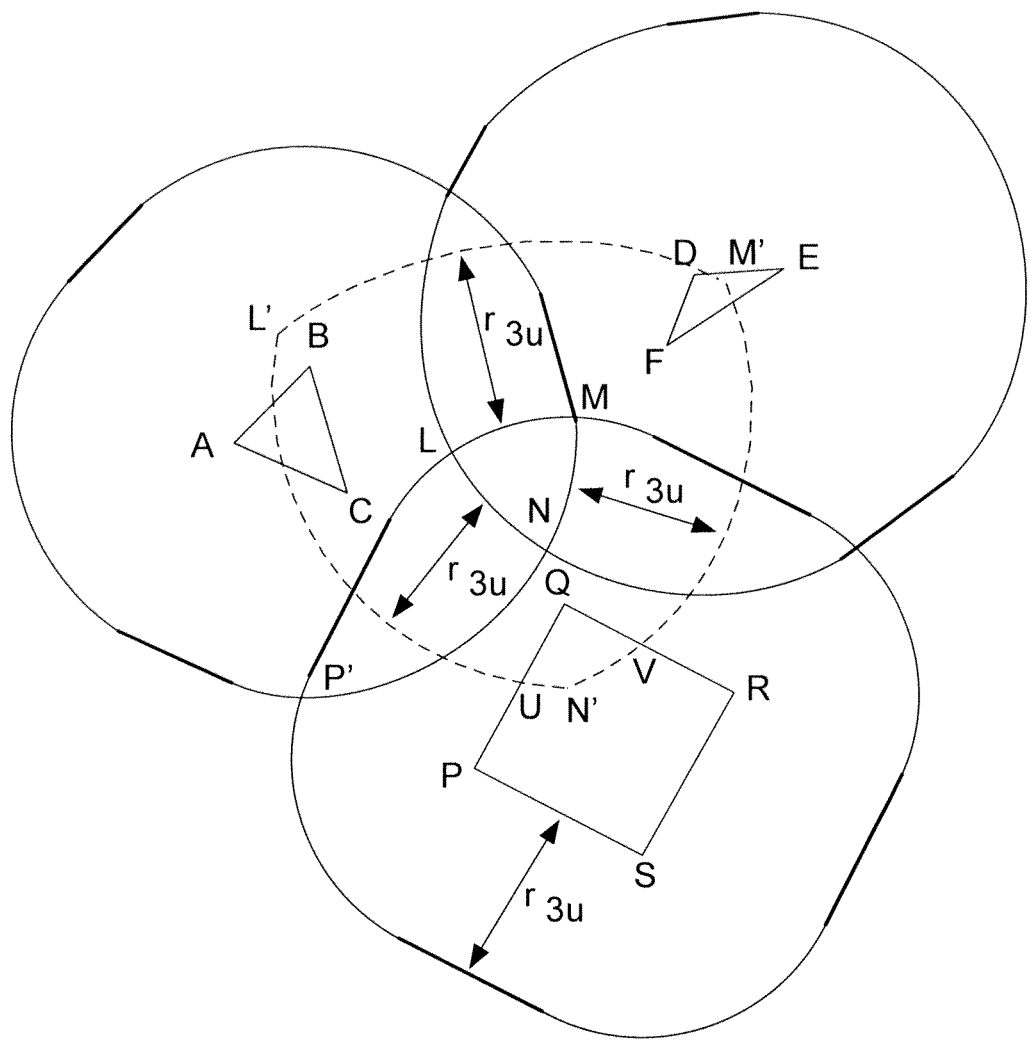
FIG. 5 is similar to FIG. 2 but with additional information.

As shown in FIG. 5, region LMN defines the minimum region of residence of node u and the measured range from node k to node u is $r_{3u}$. The region defined by the dotted lines L'M'N' is the viewed region of residence $R_{ku}$ of node k by node u. The region UN'VQ is the intersection between regions PQRS and L'M'N' and is the current minimum region of residence of node k. Following Theorem 1, the new minimum region of residence of node k is the region UN'VQ. Node u tries to similarly improve regions of residence of nodes i and j using the measured ranges $r_{1u}$ and $r_{2u}$ and its minimum region of residence $\mathcal{R}_u$.

A careful scrutiny of FIG. 4 in the above example reveals that the part of the boundary of the region of residence of node k which causes a computational improvement in the region of residence for node u, and the part of the boundary of the region of residence for node k which is refined (improved) due to this computed part of the region of residence for u, are mutually disjoint. This observation holds even if the node k would have an initial region of residence of a different shape.

Lemma 3:

Given a minimum region of residence $\mathcal{R}_u$ for a node u, and given a measured range $r_{uv}$ from a neighbor node v, the improved minimum region of residence $R_v$ for node v is given by the intersection of the viewed region of residence $R_{vu}$ for node v by node u and the current minimum region of residence $R_v$ for node V. Accordingly, the improved minimum region of residence $R_v$ for node v is given by the following expression:

$$\mathcal{R}'_v = \mathcal{R}_v \cap R_{vu} \qquad (2)$$

Proof:

The proof follows directly from lemma 2 and theorem 1.

From Lemma 3, $R'_v \subseteq_v$. The improved region of residence $R'_v$ for node v is generated by introducing some extra arc and/or straight line segments on the region of residence $R_v$ due to the region computation initiated by the node u. These set of new arcs and straight line segments may be denoted as $E_u^v$. Each element of $E_u^v$ either is parallel to some boundary edge of $R_u$ or is a circular arc of a circle with radius $r_{vu}$ centered at some vertex on the boundary of $R_u$.

If there is a path in the network starting from a node $u_0$ to some node $u_k$ given by $u_0\ u_1\ u_2\ \ldots\ u_k$, and if $u_0$ initiates its region computation by its neighbors and determines its region of residence $R_{u0}$ based on regions supplied by these neighbors, then $R_{u0}$ may cause an improvement in the determination of the minimum region of residence for node $u_1$. This improvement, in turn, may cause an improvement in the minimum region of residence for node $u_2$, and so on, so that the process of region refinements may successively follow through the nodes $u_1, u_2, \ldots, u_k$. In particular, if it is now assumed that $u_k = u_0$, i.e., $u_0\ u_1\ u_2 \ldots u_k$ is a cycle, then this process of successive minimum region of residence refinements will not be able to further refine the minimum region of residence $R_{u0}$ for node $u_0$ after a finite number of steps. The following analysis establishes this assertion as true.

Let $E_{u_0}^{u_1}$ denote the set of newly introduced lines and/or arcs on the boundary of the minimum region of residence for node $u_1$ due to the region computation for node $u_0$ caused by all the immediate neighbors of $u_0$. The changed region $R'_{u1}$ of node $u_1$ due to $E_{u_0}^{u_1}$ may cause a change in $R_{u2}$ by introducing some new lines and/or arcs which we denote by the set $E_{u0,u1}^{u2}$. In general, the set of newly added lines and/or arcs in the region of $u_j$, $1 \le j \le k$, is denoted as $E_{u0, u1, \ldots, u_{j-1}}^{uj}$. Because of the properties of Minkowski's sum of $R'_{u_{j-1}}$ and a circle of radius $r_{u_{j-1},u_j}$ (the range value between nodes $u_{j-1}$ and $u_j$) with center at the origin, it can be seen that for any j, $1 \le j \le k$, two possible cases may arise.

Case 1: A line segment (arc) in $E_{u0, u1, \ldots, u_{j-1}}^{uj}$ is parallel to some line segment (arc) in $E_{u_0, u_1, \ldots, u_{j-2}}^{u_{j-1}}$ (for j>1) or in $R_{u_0}$ (for j=1).

Case 2: An arc in $E_{u_0, u_1, \ldots, u_{j-2}}^{uj}$ is i) not parallel to any arc in $E_{u_0, u_1, \ldots, u_{j-2}}^{u_{j-1}}$ (for j>1) or in R" (for j=1), ii) but is an arc of a circle with radius $r_{u_{j-1},u_j}$ having a center at one point on the region $R'_{u_{j-1}}$ which is the point of intersection of two different arcs or two different line segments or an arc and a line segment, at least one of which must be in $E_{u_0, u_1, \ldots, u_{j-2}}^{u_{j-1}}$ (for j>1) or in $R_{u_0}$ for (j=1).

Figure 6:
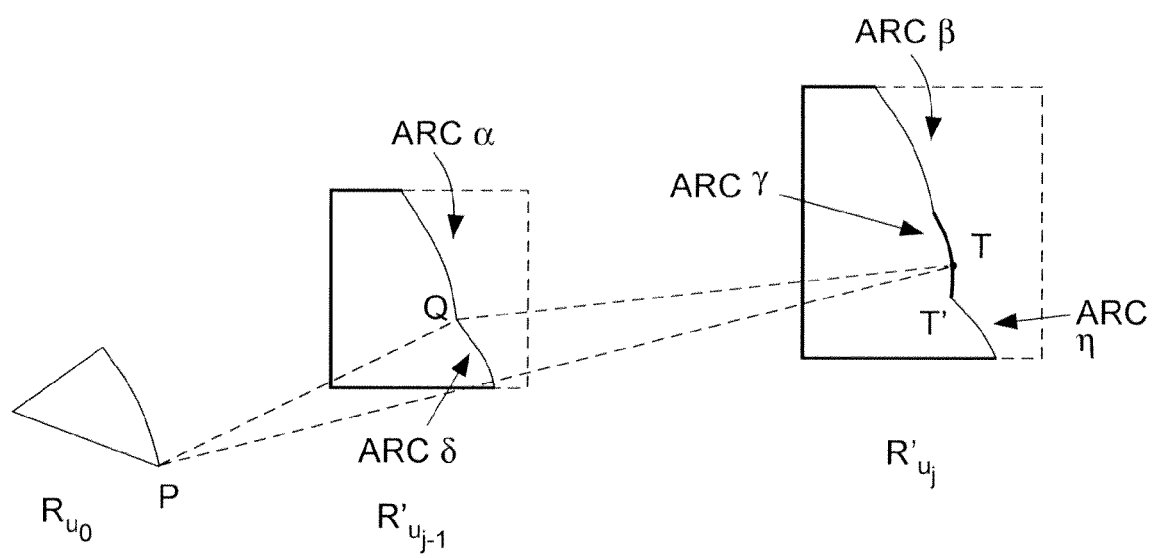
FIG. 6 is useful in explaining the present invention.

The above is illustrated in FIG. 6 where the arcs α and β on $R'_{u_{j-1}}$ and $R'_{u_j}$, respectively, are parallel to each other, while the arc γ on $R'_{u_j}$ is derived from the point Q on $R'_{u_{j-1}}$ (with Q as center and having a radius equal to $r_{u_{j-1},u_j}$). It can also be seen from FIG. 6 that, for every point on $R'_{u_j}$, there exists a unique point on $R'_{u_{j-1}}$ from which this point was derived. Thus, for the point T on $R'_{u_j}$, the corresponding point on $R'_{u_j}$ is Q, which is transitively derived from a point P on $R_{u_0}$.

Lemma 4:

Let T be any point on $E_{u0, u1, \ldots, u_{j-1}}^{uj}$, and let P be the corresponding point on $R_{u_0}$ from which T was derived. The Euclidean distance PT is always greater than or equal to the maximum of all $(r_{u_{j-1},u_j}, \forall j, 1 \le j \le k)$.

Proof:

Lemma 4 can be proven by induction on Lemma 4 is trivially true for j=1. Let it be supposed that Lemma 4 is true for j=1, 2, ..., j−1. For j≥1, the Euclidean distance PQ shown in FIG. 4 is then greater than or equal to the maximum of $(r_{u_0,u_1}, r_{u_1,u_2}, \ldots, r_{u_{j-2},u_{j-1}})$. Now, if the point T is on an arc or line segment in $E_{u0, u1, \ldots, u_{j-2}}^{uj}$ parallel to an arc or line segment in $E_{u0, u1, \ldots, u_{j-2}}^{u_{j-1}}$, then the Euclidean distance PT=PQ+QT, from which $QT = r_{u_{j-1},u_j}$ results. If, however, the point T is not on an arc/line segment in $E_{u0, u1, \ldots, u_{j-1}}^{uj}$ parallel to any arc/line segment in $E_{u0, u1, \ldots, u_{j-2}}^{u_{j-1}}$, then the corresponding point Q on $R'_{u_{j-1}}$ from which T is derived must be the point of intersection of two different arcs and/or line segments, as explained above. Without loss of generality, Q may be designated as the point of intersection of two arcs α and δ in $E_{u0, u1, \ldots, u_{j-2}}^{u_{j-1}}$ as shown in FIG. 6. The arc δ is mapped to the parallel arc η in $E_{u0, u1, \ldots, u_{j-1}}^{uj}$. If the arcs γ and η intersect at the point T', the line QT' is normal to the tangent to the arc δ. It follows that ΔPQT is an obtuse-angled triangle with the obtuse angle at point Q, which implies that the distance PT is greater than either of PQ and QT, and hence Lemma 4 follows.

Thus, it can be seen that the part of the region boundary of a neighbor node $u_j$ of node $u_0$, $\forall j, 1 \le j \le k$ which gets modified (refined) due to the region computation initiated by node $u_0$, is always at a distance greater than or equal to $r_{u_0,u_1}$ from the corresponding part of the region $R_{u0}$ which caused this refinement of the region $R_{u_j}$. Hence, the following important Theorem 3 results, which guarantees the termination of the successive refinement algorithm.

Theorem 3:

If a node u initiates its region computation with the help of range readings from all of its neighbor nodes, the computed region $R_u$ of node u may cause refinements of the successive neighbors through the whole network, but it will never be able to further refine $R_u$ of node u itself.

Definition 2:

The stable region of residence $S_u$ of a node u is the minimum region of residence of node u which cannot be further improved upon using the current global set of range readings for all node pairs in the network.

Theorem 4:

A node u can compute its stable region of residence once it gets the range readings of all possible directly communicating nodes in the network along with the initial region information of all nodes.

Theorem 5:

The computation of the stable regions of residence of all nodes in the network is functionally equivalent to an all-to-all broadcast of the range information of all node-pairs in the network (the set RR) and the set $Ref_n$.

The designation RN is used herein to denote an individual reference node, and $Ref_n$ is used herein to denote the set of all reference nodes (RNs) in the network.

Proof:

To reconstruct the ad hoc network graph centrally, two pieces of information are required: (i) the measured ranges of all node pairs, and (ii) the information as to whether an individual node is a reference node. From Theorem 4, it can be seen that, if a node possessed the range values of all node-pairs in the network (the set RR) and the set $Ref_n$, it could locally construct the network graph and then compute the stable regions of residence of all nodes. Since the possession of the set RR and the set $\text{Ref}_n$ by a node in the network effectively implies a broadcast of these two sets, if every node were to locally compute the stable regions of residence, the problem maps out to be that of an all-to-all broadcast of the set $RR_i$ and the status (whether its a reference node) of each node i in the system. Each node, on receiving this information from a neighbor node, attaches its own $RR_i$ set and its status and broadcasts the message again.

The above description can be the basis of a location identification algorithm. Accordingly, every node in a network maintains a local variable status, $\text{status}_i$, which is set to 1 if the node is a reference node, and is set to zero otherwise. Initially, the minimum regions of residence of all non-reference nodes are assumed to be infinity. Each node i does a ranging with its neighbors to obtain a set $RR_i$ of measured ranges. Each node i then computes the viewed region of residence for every node j∈N(i). Node i then exchanges the following three pieces of information with each neighbor j∈N(i): 1) the value of the status variable, 2) the viewed region of residence $R_{ji}$ for node j, and, iii) the area of the current minimum region of residence $A_i$ of node i.

The set $RR_i$ of measured ranges may be defined as $RR_i = \{r_{ij}: j \in N(i)\}$, and the set of viewed regions of residence $R_{ij}$ may be denoted as $\mathcal{T}$. Once node i has determined its viewed region of residence $R_{ij}$ from each of its neighbor node j, node i computes its current minimum region of residence using the following sub-routine of the algorithm described below.

```
Function compute_region: Boolean
var A_old, A_i : Real;
begin
    for each R_ij ∈ T such that A_j ≠ ∞ do
        /* Compute the minimum region of residence
           of node i from the viewed regions */
        R_i ← R_i ∩ R_ij;
    endfor;
    A_i ← Area of R_i;
    if A_i < A_old then return true;  /* R_i improved */
    else return false;  /* No improvement in R_i */
end.
```

Once node i computes its minimum region of residence $\mathcal{R}_i$, it tries to improve the minimum region of residence of each of its neighbors using the following sub-routine of the algorithm described below:

```
Procedure improve_region
begin
    for each j ∈ N(i) such that status_j ≠ 1 do
        /* Construct R_ji, the viewed region of j */
        R_ji = R_i ⊕ r_ij;
        Transmit R_ji to node j;
    endfor;
end.
```

The following location identification algorithm uses the sub-routines described above and is executed by each node i until that node attains its stable region of residence $S_i$.

```
Algorithm location_region_identify
var region_change_flag: Boolean;
begin
    while (true)
        Get neighbor set N(i);
        Generate RR_i: measure range with every
            neighbor j ∈ N(i);
        region-change-flag = false;
        repeat
            Get T : viewed regions of residence R_ij
                from every neighbor j;
            if status_i = 0 then region_change_flag =
                compute_region(i, T );
            improve_region(i, N(i) , RR_i);
        until region_change_flag = false;  /*
            iterate until R_i = S_i */
    endwhile;
end.
```

Figure 7:
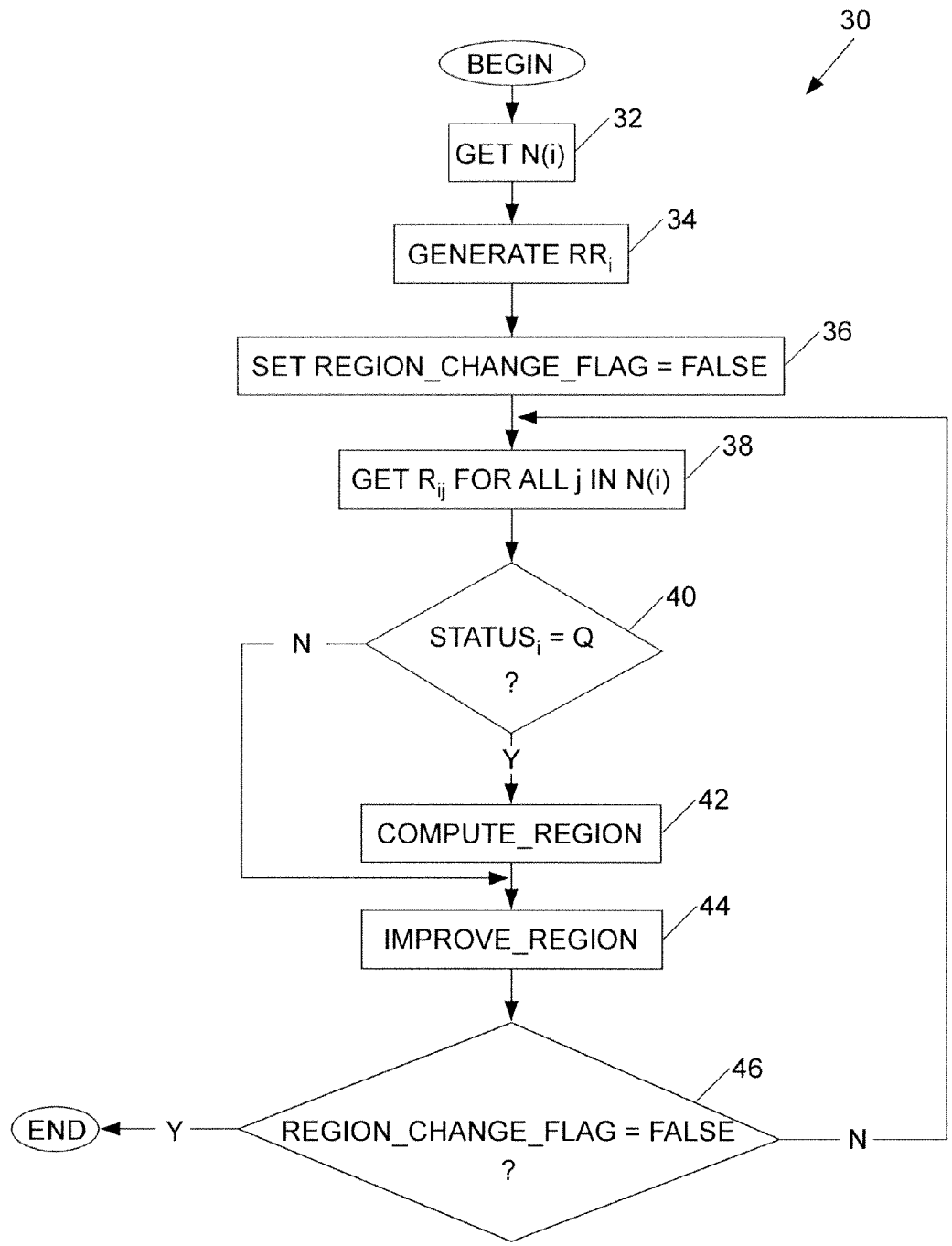
FIGS. 7, 8, and 9 show a flow chart illustrating a program executed by each node to determine its minimum region of residence.
Figure 8:
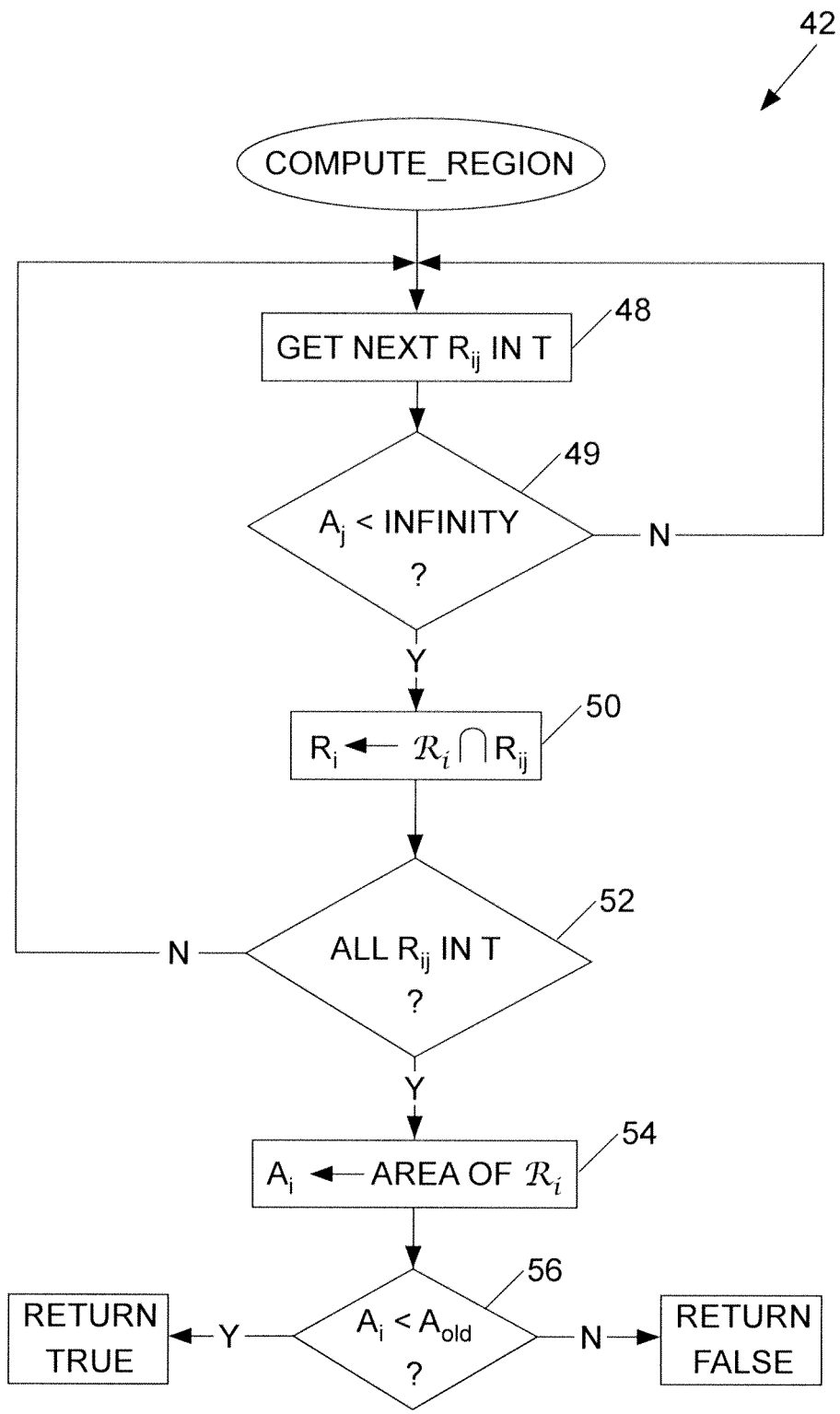
Figure 9:
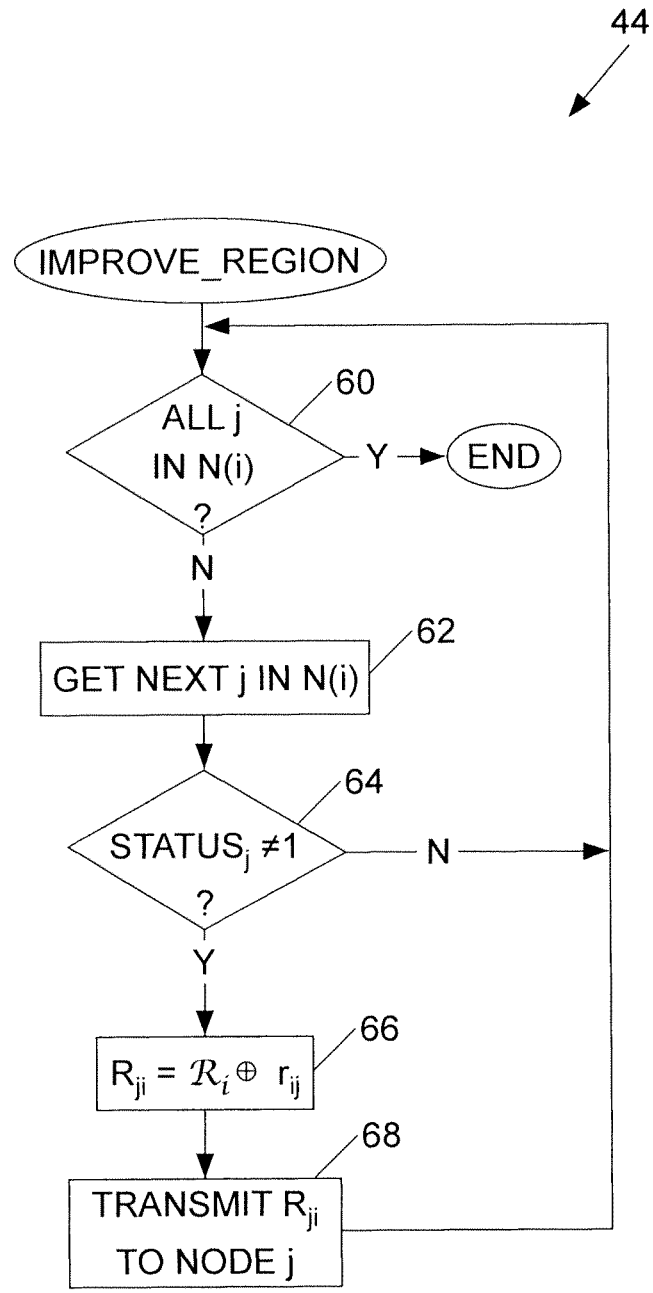

The above Algorithm is shown graphically in FIGS. 7, 8, and 9 by the flow chart of a program 30 that is executed by the computer 14 of each of the nodes 12 in the network 10. Accordingly, as shown in FIG. 7, a node i at 32 gets the set of nodes N(i) within its transmission range, i.e., the nodes in its neighborhood. For example, node i transits a signal asking each node j to identify itself. The nodes that respond are in N(i).

At 34, node i generates $RR_i$ by generating the range $r_{ij}$ between itself and each of its neighbor nodes j in N(i). Node i can generate this range information using any known technique. At 36, node i sets a flag, designated region_change_flag, to false and then initiates execution of a loop having blocks 38-46.

Accordingly, at 38, node i receives from its neighbor nodes j in N(i) all regions of residence $R_{ij}$ of node i as viewed by nodes j. All of these regions of residence $R_{ij}$ of node i as viewed by all nodes j in N(i) form a set $\mathcal{T}$. That is, as discussed above, given the range measurement $r_{ij}$ from node j to node i, the region of residence of node i in the view of node j (i.e., $R_{ij}$) is the region formed by extending the region of residence $R_j$ of node j in every direction by the measured range value $r_{ij}$. Thus, the region of residence of node i in the view of node j is $R_{ij} = R_j \oplus r_{ij}$, and $R_{ij}$ is denoted as the viewed region of residence of node i.

It should be noted that, if node i is not a reference node and has not computed its own region of residence, then it's area $A_i$ for its region of residence $R_i$ is considered to be infinity as discussed above. Infinity is used as a place holder in the algorithm.

At 40, a test is made to determine whether node i is a Reference node by determining whether $\text{status}_i$ for node i is 0. If $\text{status}_i$ for node i is 0, node i is not a Reference node. If $\text{status}_i$ for node i is 0, the sub-routine compute_region 42 shown in FIG. 8 is executed.

As shown in FIG. 8, the sub-routine compute_region 42 at 48 processes the next region of residence $R_{ij}$ in the set $\mathcal{T}$. However, at 49, if the area $A_j$ for the node j corresponding to this next region of residence $R_{ij}$ is infinity, then that node j is not a reference node and has not had its location previously identified by the Algorithm. Accordingly, $R_{ij}$ for this node cannot yet be used in the algorithm of FIG. 8 and program flow returns to 48 to get the next $R_{ij}$ in the set $\mathcal{T}$.

Assuming that the next region of residence $R_{ij}$ for the node i in the view of a node j that corresponds to a non-infinite area $A_j$ is available, a block 50 computes a new minimum region of residence $\mathcal{R}_i$ for node i as the intersection between the current minimum region of residence $\mathcal{R}_i$ for node i and the region of residence $R_{ij}$ for the node i in the view of the nodes j. (If all of the regions of residence $R_{ij}$ in the set $\mathcal{T}$ initially correspond to an infinite area $A_j$ because none of the nodes j in N(i) have as yet had their locations previously identified by the Algorithm, then the initial current minimum region of residence $\mathcal{R}_i$ for node i is infinity.)

If all regions of residence $R_{ij}$ in the set $\mathcal{T}$ have not been processed as determined by the block 52, program flow returns to the block 48. Thus, blocks 49 and 52 together ensure (i) that all nodes j in N(i) have had their locations determined, (ii) that, as a result of (i), all nodes j in N(i) have been able to determine the regions of residence $R_{ij}$, and (iii) that, as a result of (ii), the node i has been able to compute at the block 50 meaningful intersections with all nodes j in N(i).

When all regions of residence $R_{ij}$ in the set $\mathcal{T}$ have been processed by the blocks 48, 49, 50, and 52, the new area $A_i$ for node i is set as the area of $\mathcal{R}_i$ at 54 and the new area $A_i$ is compared to the old area $A_{old}$ for node i. If the new area $A_i$ is not less than the old area $A_{old}$ for node i, then the new area $A_i$ was not improved and is the stable region of residence $S_i$. Accordingly, a false is returned to the algorithm of FIG. 7. If the new area $A_i$ is less than the old area $A_{old}$ for node i, then the new area $A_i$ was improved and a true is returned to the algorithm of FIG. 7 and the sub-routine improve_region 44 is performed to improve $\mathcal{R}_i$.

In the case with the node i is a Reference node, node i by-passes execution of the sub-routine compute_region 42. Thus, if status$_i$ for node i is 1 as determined at 40 of FIG. 7, node i is a Reference node, and the sub-routine improve_region 44 is entered directly. In the case with the node i is a not a Reference node, the sub-routine improve_region 44 is executed following execution of the sub-routine compute_region 42.

As shown in FIG. 9, the sub-routine improve_region 44 at 60 determines whether all nodes j in N(i) have been processed by the sub-routine improve_region 44. If all nodes j in N(i) have been processed by the sub-routine improve_region 44, execution of the sub-routine improve_region 44 ends.

If all nodes j in N(i) have not been processed by the sub-routine improve_region 44, the next node j in N(i) is obtained and its status is checked to determined if the node j is a Reference node. If status for node j indicates that node j is not is a Reference node, the region of residence for the node j in the view of node i is determined at 66 by extending the region of residence $R_i$ of node i in every direction by the measured range value $r_{ji}$. This region of residence $R_{ji}$ for the node j in the view of node i is transmitted at 68 to node i so that node i can use it during the next iteration of the sub-routine compute_region 42.

As shown in FIG. 7, if the sub-routine compute_region 42 returns a false, then the algorithm terminates and the last calculated $\mathcal{R}_i$ is the final minimum region of residence for node i. However, if the sub-routine compute_region 42 returns a true, program flow returns to the block 38 for another pass through the sub-routine compute_region 42 and the sub-routine improve_region 44.

All nodes including the reference nodes execute the algorithm of FIGS. 7-9. Initially, no nodes except for the reference nodes have a region of residence that is smaller than infinity. Therefore, initially, only the neighbors of the reference nodes are able to determine regions of residence (based on extending the regions of residence of the reference nodes) that have areas smaller than infinity. However, as these nodes determine their own regions of residence smaller than infinity, they can extend their own regions of residence to enable their neighbors to determine regions of residence that have areas smaller than infinity. Accordingly, the process of determining regions of residence smaller than infinity spreads out from the reference nodes to cover all nodes in the network.

Certain modifications of the present invention have been discussed above. Other modifications of the present invention will occur to those practicing in the art of the present invention. For example, the present invention has been described with particular reference to sensor networks. However, the present invention has applicability to other networks as well.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method of identifying a location of a first node in a network having a plurality of nodes comprising:
   receiving a location of a region that is guaranteed to contain the first node, wherein the receiving of a location of a region that is guaranteed to contain the first node comprises:
   receiving a region of a second node that was extended by a measured range value $r_{ij}$,
   wherein the second node is within a transmission range of the first node, and
   wherein $r_{ij}$ is based on a range between first and second nodes;
   determining a region of residence of the first node based on the region that is guaranteed to contain the first node, wherein the region of residence has a size; and
   iteratively minimizing by a computer the size of the region of residence of the first node.

2. The method of claim 1 wherein the iteratively minimizing of the size of the region of residence of the first node terminates when the minimum region of residence of the first node is not improved as a result of an iteration.

3. The method of claim 1, wherein the determining of a region of residence of the first node comprises determining a minimum region of residence of the first node based on a viewed region of residence of the first node and a previously determined minimum region of residence of the first node.

4. The method of claim 3 wherein the iteratively minimizing of the size of the region of residence of the first node terminates when the minimum region of residence of the first node is not improved as a result of an iteration.

5. The method of claim 1, wherein iteratively minimizing by a computer the size of the region of residence of the first node comprises:
   determining a region of residence of a third node in the view of the first node, wherein the third node is within a transmission range of the first node; and
   transmitting to the third node the region of residence of the third node in the view of the first node.

6. The method of claim 5 wherein the iteratively minimizing of the size of the region of residence of the first node terminates when the minimum region of residence of the first node is not improved as a result of an iteration.

7. The method of claim 5, wherein determining a region of residence of the first node comprises determining a minimum region of residence of the first node based on a viewed region of residence of the first node and a previously determined minimum region of residence of the first node.

8. The method of claim 7 wherein the iteratively minimizing of the size of the region of residence of the first node terminates when the minimum region of residence of the first node is not improved as a result of an iteration.

* * * * *